(No Model.)
C. A. VON WELSBACH.
APPARATUS FOR REGENERATING INCANDESCENT MANTLES.
No. 400,419. Patented Mar. 26, 1889.
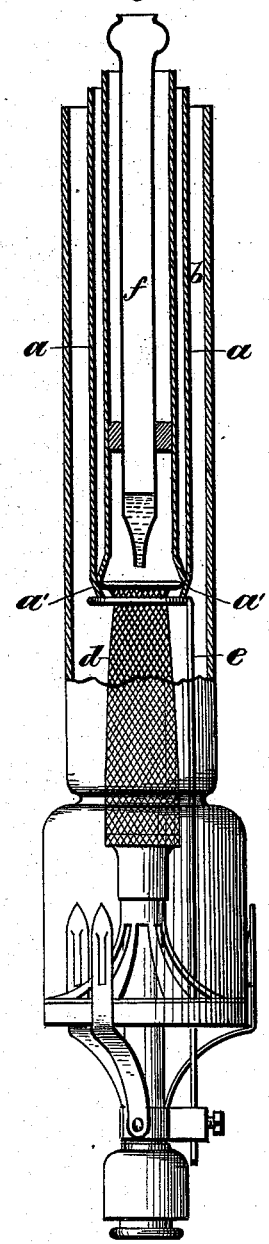
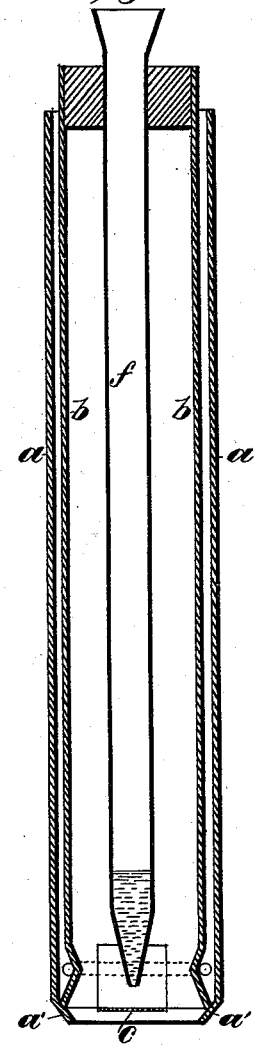
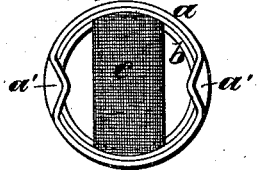
Witnesses.
Robert Everett
Percy B. Hills.
Inventor:
Carl Auer von Welsbach,
By James L. Norris.
Atty.

UNITED STATES PATENT OFFICE.

CARL AUER VON WELSBACH, OF VIENNA, AUSTRIA-HUNGARY, ASSIGNOR TO THE WELSBACH INCANDESCENT GAS LIGHT COMPANY, OF NEW JERSEY.

APPARATUS FOR REGENERATING INCANDESCENT MANTLES.

SPECIFICATION forming part of Letters Patent No. 400,419, dated March 26, 1889.

Application filed March 31, 1888. Serial No. 269,199. (No model.) Patented in Germany January 26, 1887, No. 44,016; in England April 28, 1887, No 6,239, and in Austria-Hungary May 13, 1887, No. 1,663 and No. 16,176.

*To all whom it may concern:*

Be it known that I, CARL AUER VON WELSBACH, a subject of the Emperor of Austria, residing at Vienna, Austria-Hungary, have invented new and useful Improvements in Apparatus for Regenerating Mantles of Incandescing Substances, (for which I have obtained Letters Patent in Great Britain, No. 6,239, dated April 28, 1887; in Germany, January 26, 1887, No. 44,016, and in Austria-Hungary, applied January 4, 1887, granted May 13, 1887, Nos. 1,663 and 16,176,) of which the following is a specification.

This invention relates to an apparatus for use in applying a coating of regenerating fluid or solution of earthy salts to mantles of incandescing substances, such as are employed in the Welsbach system of incandescent gaslighting. Such mantles, hoods, or caps, usually of tubular form, are made by saturating a textile fabric with a solution of the salts of the rarer metals or refractory earths, then drying and shaping the mantle, and then exposing it to the heat of a gas-flame to burn out the textile material, drive off the acid of the salt, and leave the mantle composed of a skeleton-like body of earthy oxides having a high light-emitting power.

I have found that incandescence bodies consisting of mantles formed of finely-divided particles of the oxides of the rarer metals or refractory earths—such as thorinum, zirconium, lanthanum, and yttrium—deteriorate more or less in course of time as regards their light-emitting power. I have also found that this difficulty can be obviated by a process of regeneration, which consists in applying to the exhausted or deteriorated mantle a fresh coating of the earthy oxide, whereby the incandescent qualities of the mantle are restored. Compounds rich in lanthanum oxide are particularly applicable for this regenerating process, though the oxides of other rarer metals or their earths, preferably in the form of a nitrate, may also be employed.

In subjecting incandescence mantles to the regenerating process the solution, say, of lanthanum nitrate is dropped onto the upper end thereof, whence it trickles downward, so as to gradually cover the entire net-work, the small apertures of the mantle being also covered by a thin film. This operation may be effected by means of a suitable apparatus to be presently described; or, in place of dripping on the solution, it may be applied to the mantle by a brush or in the form of spray, or by dipping the mantle into a bath of the solution. If the first-described method is adopted, it is not necessary to remove the mantle from its ordinary position in the burner, nor to remove the chimney-glass. When the water of the solution has evaporated, there remains a crystalline coating of lanthanum nitrate or other salt in a finely-divided state upon and within the pores of the mantle. Upon then lighting the flame of the burner this coating is at once converted into an oxide, which forms a continuous coating of incandescent material over the entire mantle.

The accompanying drawings show a suitable construction of apparatus for applying the regenerating-solution according to the first above-described method.

Figure 1 is a vertical section of the apparatus; Fig. 2, a plan of the under side; and Fig. 3, a vertical section of the apparatus, drawn to a smaller scale, as applied to an ordinary lamp.

$a$ is a tube of glass, vulcanite, or other suitable material that is not affected by the solution, within which is a second tube, $b$, of similar material, resting with its lower end upon inward projections $a'$ of the tube $a$, and carrying at its lower end a strip, $c$, of some light porous material—such as linen or fine platinum wire-gauze—attached at each end to the tube $b$, and sagging down slightly, as shown in Fig. 3, so that when the tube $a$ is placed upon the wire support $e$ of the mantle $d$ the strip $c$ will lie lightly upon the top of the mantle.

Within the tube B is a third tube, $f$, of small diameter, supported centrally therein in any convenient manner, and formed with a funnel-mouth at top, while at its lower end it is formed with a nozzle having a very small capillary opening, which is situated a small distance from the strip $c$. On allowing the regenerating-solution to flow gently down the tube $f$, it will issue thence by drops onto the strip $c$, from which it will flow uniformly over the upper end of the mantle, whence it trickles down over the whole surface thereof. The apparatus is then removed, and the operation of regenerating the mantle is completed by exposing it to heat, as above described.

What I claim as my invention is—

1. In an apparatus for applying a coating of regenerating-solution to mantles, the combination, with the tube b, having secured across its lower end a strip of porous material, c, of the tube f, centrally supported in the tube b above said porous material, and provided at its lower end with a small capillary opening for the escape of the regenerating-fluid, substantially as described.

2. In an apparatus for applying a coating of regenerating-solution to mantles, the combination of the tube a, having inward-turned projections a', the tube b, supported within the tube a and resting on said projections, the strip of porous material c, secured across the lower end of the tube b and the tube f, supported centrally in the tube b above said porous material, substantially as described.

In testimony whereof I affix my signature in presence of two witnesses.

CARL AUER VON WELSBACH.

Witnesses:
FRED WILLIAMS,
EDMUND JUSSEN.